United States Patent [19]

Markkanen et al.

[11] 4,208,009
[45] Jun. 17, 1980

[54] DOCUMENT READING SYSTEM

[75] Inventors: Carl O. Markkanen, Hasbrouck Heights; William G. Benson, West Orange, both of N.J.; Amnon Goldstein, Manhasset, N.Y.

[73] Assignee: Sweda International, Inc., Paramus, N.J.

[21] Appl. No.: 873,647

[22] Filed: Jan. 30, 1978

Related U.S. Application Data

[63] Continuation of Ser. No. 647,467, Jan. 8, 1976.

[51] Int. Cl.$^2$ .................... G06K 13/16; B65H 3/12; B07C 3/14
[52] U.S. Cl. .................................... 235/475; 271/94; 209/583
[58] Field of Search ............... 235/61.11 R, 61.11 E, 235/61.11 J, 61.9 R, 475, 476, 477; 271/5, 6, 11, 12, 90, 91, 94, 177; 209/72, DIG. 1; 360/88; 340/149 A, 146.3 R; 250/569

[56] References Cited

U.S. PATENT DOCUMENTS

| | | | |
|---|---|---|---|
| 2,977,114 | 3/1961 | Hanson | 271/94 |
| 3,051,309 | 8/1962 | Leathers | 209/72 |
| 3,122,069 | 2/1964 | Lopez | 271/94 |
| 3,126,199 | 3/1964 | Rosoff | 271/12 |
| 3,260,519 | 7/1966 | Coleman | 271/5 |
| 3,703,628 | 11/1972 | Philipson | 235/61.9 R |
| 3,847,346 | 11/1974 | Dolch | 235/61.11 E |
| 3,874,652 | 4/1975 | Bilbrey | 271/6 |
| 3,907,278 | 9/1975 | Jaton | 271/11 |
| 3,942,786 | 3/1976 | Lauren | 271/177 |

Primary Examiner—Robert M. Kilgore
Attorney, Agent, or Firm—Norman Friedman; Robert F. Rotella

[57] ABSTRACT

A batch reading system for automatically reading documents such as tags or tickets having data marked thereon in the form of human readable characters which are also automatically readable by suitable apparatus, the system being capable of feeding documents which are curled, wrinkled, bent, and otherwise deformed or mutilated. The documents are fed from an input hopper by first feed means, which may be a vacuum belt, from which they are fed to a second vacuum belt on whose underside the tags are held and fed past an underlying automatic reading device. The documents which are properly read are each stripped from the overlying vacuum belt by a flipper arm into a discharge chute, while other tickets are fed past the discharge chute to a reject stacker. To accurately laterally position the documents being fed, one of their longitudinal edges is pressed against a reference surface. The documents are fed past the reading head in a direction transverse to the various lines of data recorded on the document, whereby each line of data is presented successively to the reading head. The system is also able to handle and properly feed intermixed documents of various lengths and widths.

15 Claims, 9 Drawing Figures

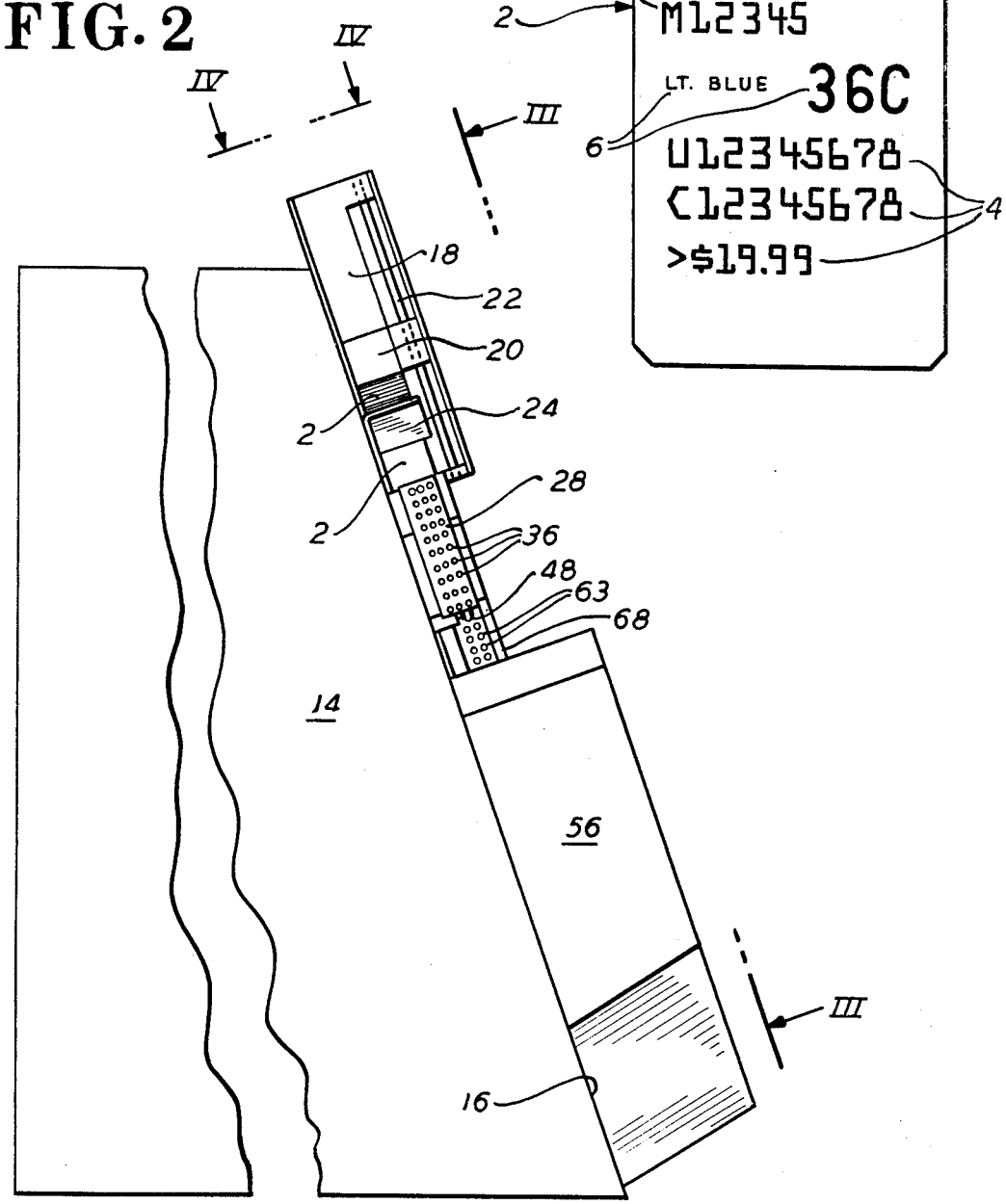

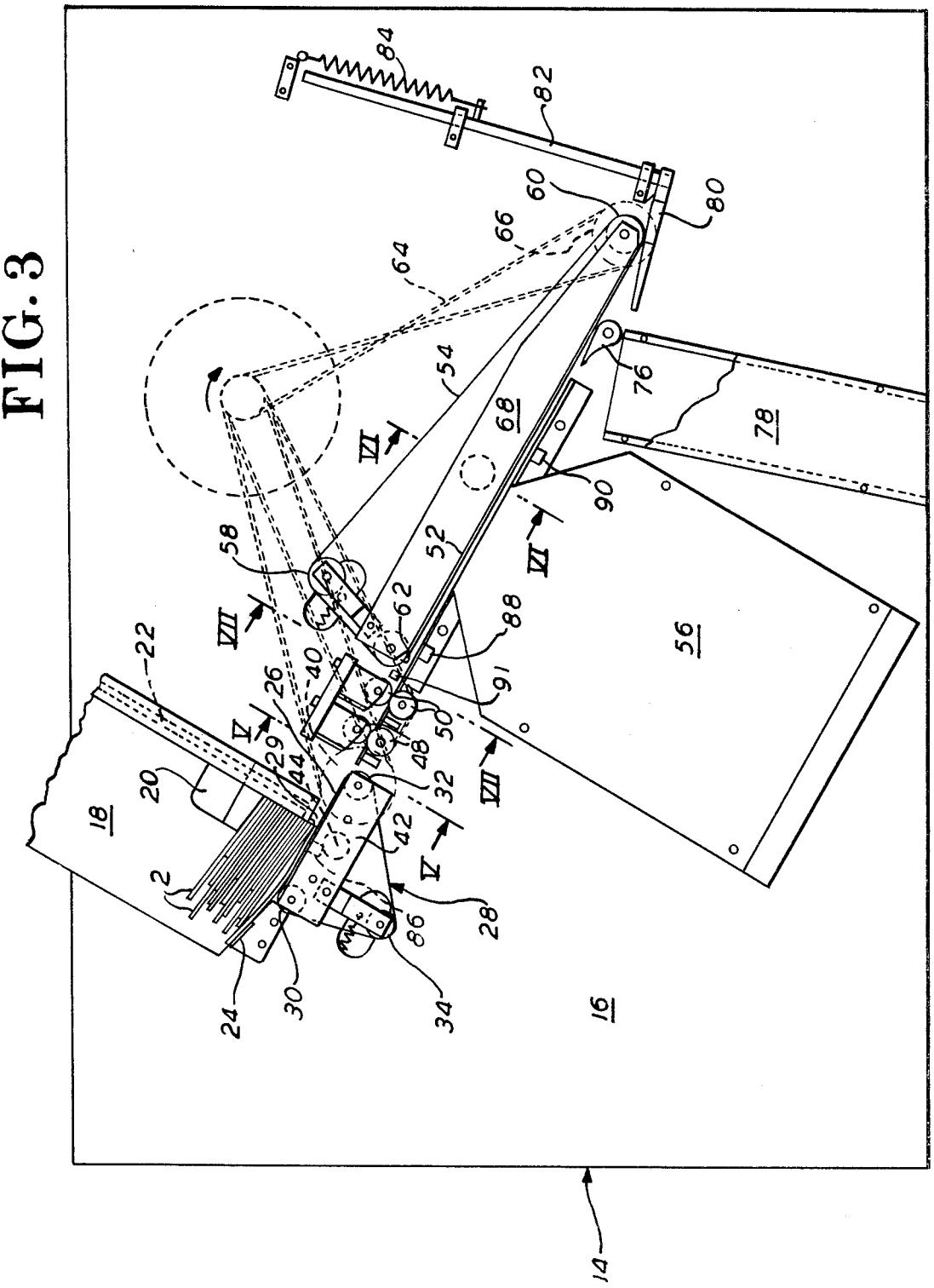

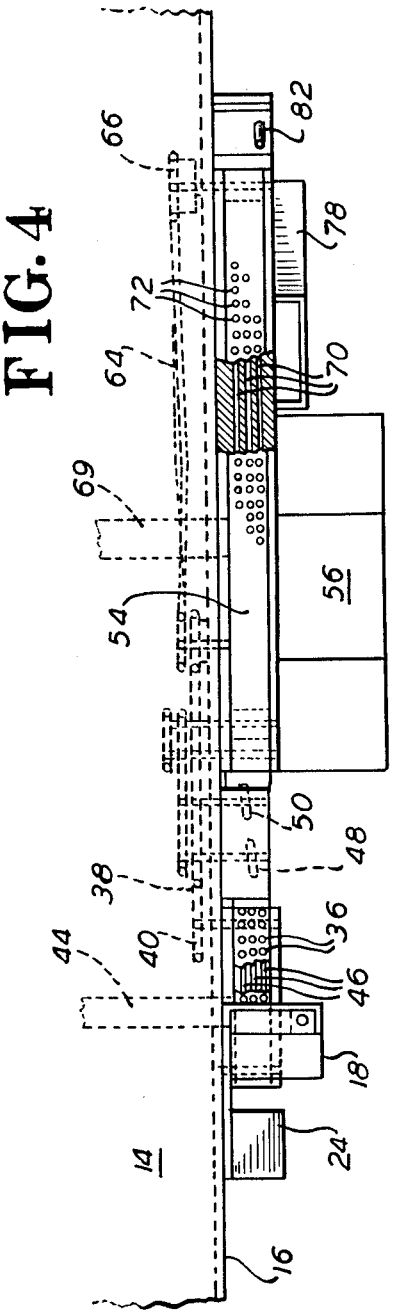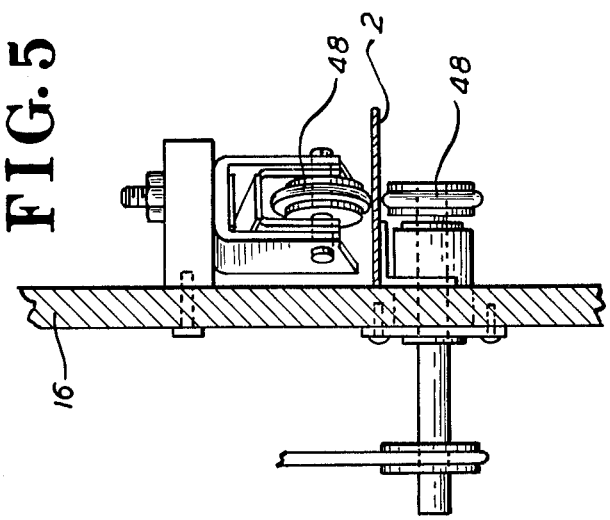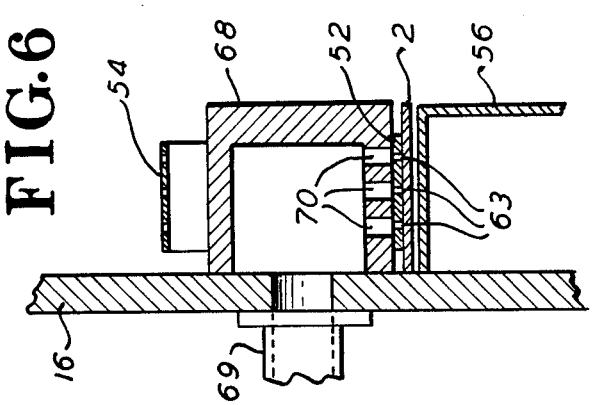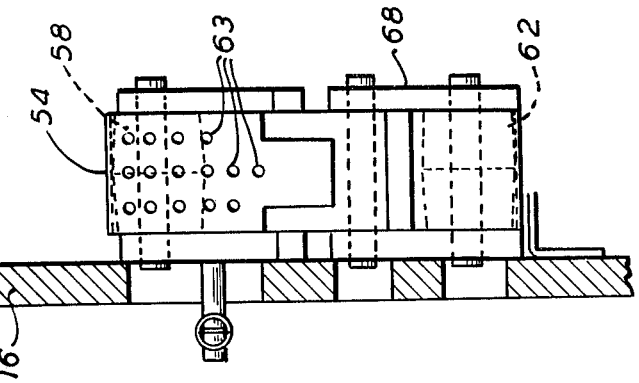

DOCUMENT READING SYSTEM

This is a continuation of application Ser. No. 647,467, filed Jan. 8, 1976.

BACKGROUND OF THE INVENTION

In stores and in industrial applications, it long has been customary to affix to merchandise and other articles, or their outer wrappers or other containers, a document such as a ticket or tag having marked thereon information pertaining to the article, e.g., size, price, a number identifying what the merchandise is for inventory control purposes, etc. To provide for subsequent automatic data processing of such documents, it has also been customary to include some or all of the information on the document in the form of encoded arrangements of punched holes, in addition to having the information printed in conventional human readable form.

It has recently been proposed that instead of having the automatically readable information applied to the documents in the form of punched holes, the information instead be printed on the documents as optical character recognition (OCR) characters, i.e., characters which are both human readable as conventional characters but which are specially configured so as to be also machine readable by suitable OCR automatic reading apparatus. Such proposals and standards and specifications for such documents and OCR characters are set forth in the publication "Voluntary Retail Identification Standard Specification-A-1974" dated Sept. 12, 1974 and issued by the National Retail Merchants Association of New York, N.Y. The foregoing publication is in part based upon the publication "American National Standard Character Set and Print Quality for Optical Character Recognition, (OCR-A), X3.17-1974" issued in 1974 by the American National Standards Institute of New York, N.Y. Both the foregoing publications are hereby incorporated by reference into the disclosure of the present patent application.

The tags may be a one-part tag, or a plural-part tag where each of the plural parts may have, at least in part, identical information marked thereon. In the case of a plural-part tag, in use in a store it is customary for the tag parts to be torn off from each other. This usually results in the torn-off parts having a fuzzy, non-clean edge. Additionally, in use the tags often develop a curl and become bent, wrinkled, and otherwise deformed or mutilated. This makes it difficult to feed them accurately in reading and other systems in which the tags are handled.

The following U.S. Pat. Nos. disclose prior art document handling systems: 2,977,114; 3,051,309; 3,101,942; 3,151,863; 3,791,516.

SUMMARY OF THE INVENTION

It is a primary object of the present invention to provide a document handling system, for reading and other systems, which will properly and accurately transport for reading or other purposes the foregoing kinds of documents, and especially documents which are curled, wrinkled, bent or otherwise deformed or mutilated.

It is a further object to provide such a system wherein the documents are fed by belt means.

It is a further object to provide such a system wherein the documents are fed by vacuum or suction transport means.

It is a further object to provide such a system in which the documents are fed for reading by an overlying feed means, which may be in the form of a suction belt, and the documents are read from underneath.

It is a further object to provide such a system which is open in arrangement and therefore accessible for ease of maintenance and repair.

It is a further object to provide such a system in which the documents are fed for reading in a direction transverse to the direction in which the lines of OCR printing on the document extend, so that the printed lines are presented successively to the reading head.

It is a further object to provide such a system which will handle documents of intermixed dimensions.

In the specific embodiment disclosed herein, the feeding means is in the form of a member, such as a belt, which provides a feeding surface against which the documents are held and maintained is driven face-to-face contact, preferably by suction means. Preferably, the belt is perforated, and the suction applied to the documents through the perforations. One such belt feeds the documents from an input hopper, and another belt thereafter feeds them past means for reading data from the documents. Such feeding means flattens the documents and enables the documents to be accurately fed even though they are curled, wrinkled, bent, etc.

Preferably, the documents being fed to the reading means pass above the latter and are fed from overhead. That is, the documents are held on the underside of an overlying transport belt and are fed over the underlying readng means.

Also, the documents are preferably fed to the reading means in a direction transverse to the direction in which the lines of printed OCR or other machine readable data on the documents extend. Thus, each line of data is presented successively to the reading head to be read by the latter.

The above and other objects, advantages, and features of the invention will become apparent to those of ordinary skill in the relevant art from the following detailed description of a specific embodiment of the invention.

BRIEF DESCRIPTION OF THE FIGURES

FIG. 1 is a top plan view of a typical tag or ticket type of document to be handled and read by the batch reading system of the present invention.

FIG. 2 is a left side elevational view of the system.

FIG. 3 is a front elevational view taken in the direction of the arrows III—III of FIG. 2.

FIG. 4 is a top plan view taken in the direction of the arrows IV—IV of FIG. 2.

FIGS. 5, 6, and 7 are enlarged detail sectional views taken respectively on lines V—V, VI—VI, and VII—VII of FIG. 3.

DETAILED DESCRIPTION OF A SPECIFIC EMBODIMENT

Figure 9:
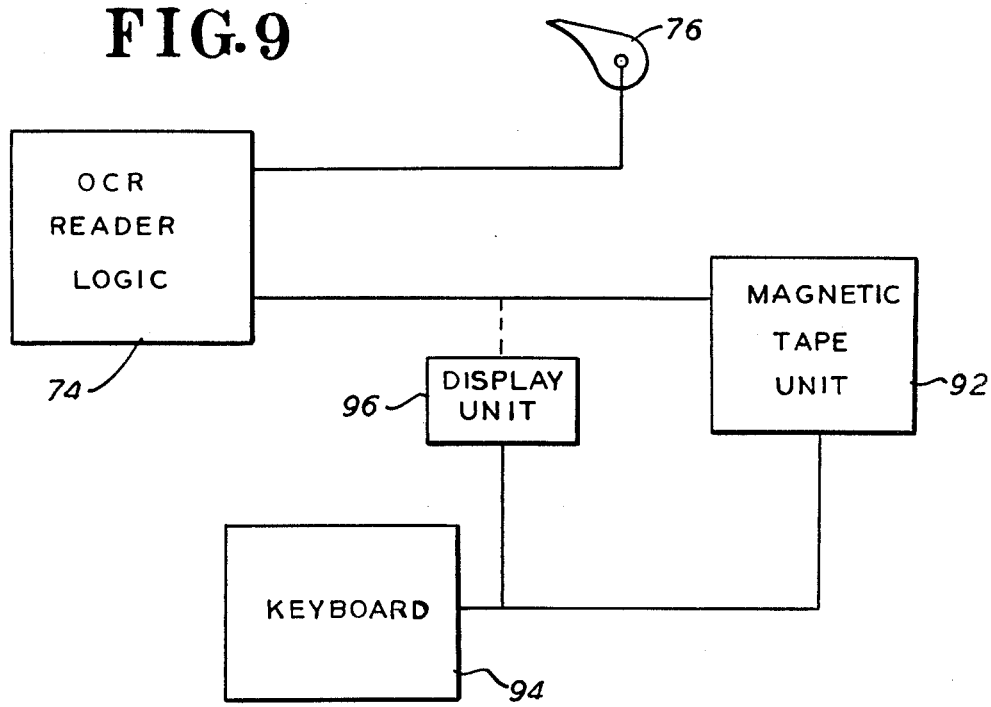
FIG. 9 is a block diagram of the system.

FIG. 1 shows a typical representation tag or ticket document 2 to be read by the system of the present invention. Printed on the document are lines 4 of optical character recognition (OCR) data which is both human readable and automatically optically readable. Typically, the OCR printed information may give the store department number, manufacturer's identification, style number, color, size, price, and other relevant information. Also printed on the document in non-OCR type, i.e., human readable only, may be other data 6, such as the color and the size designation if the article is a garment. The tag 2 may also bear at its top the store or brand name. It also may contain a hole 8 through which is passed any suitable device for attaching the tag to the garment or other article. The tag is 1⅛ to 1¼ inches in width and, depending on the format, varies in length from 1-7/16 inches to 3½ inches. As will be described in greater detail subsequently, in the present system the documents are fed in the direction of their length, i.e., transverse to the direction in which the lines of printing extend, so that each line of printing on the document is successively fed past the OCR reading station. Furthermore, the present handling system will accommodate and properly feed documents of intermixed sizes including those falling within the aforementioned dimensional ranges.

Referring particularly to FIG. 2, the system includes a main rear housing 14 within which are housed the drive motor, vacuum pump, and certain other portions of the system. The front wall 16 of the housing functions, in a manner to be described shortly, as a reference guide surface against which the inside side edges of the tags being fed are abutted to properly position them laterally for reading. As seen in FIG. 2, reference wall 16 slopes rearwardly from a vertical plane at an angle of approximately 20°.

Figure 8:
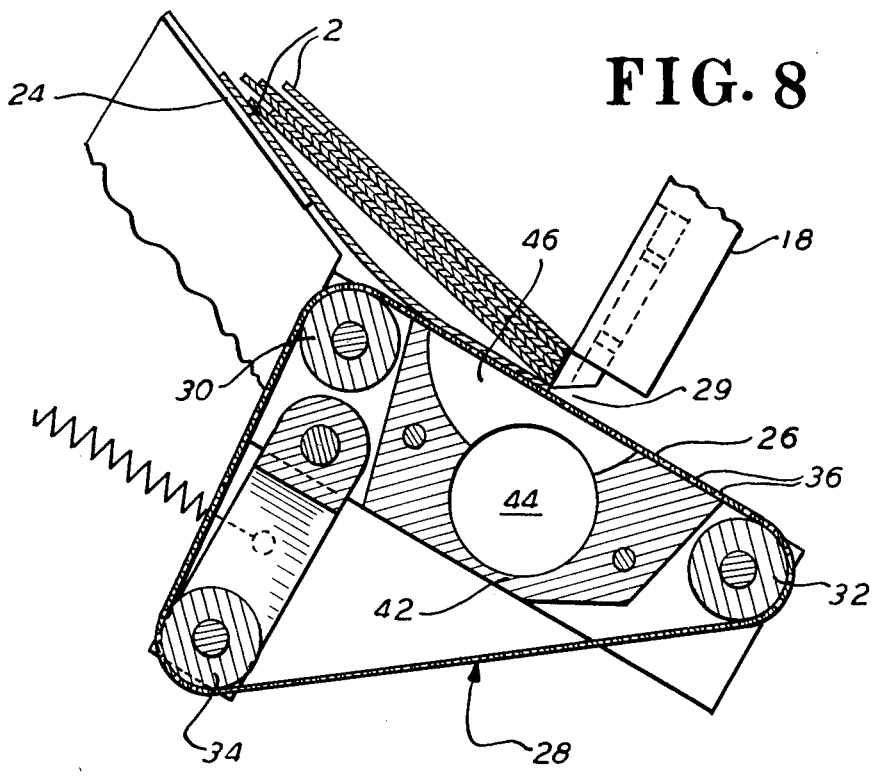
FIG. 8 is an enlarged detail front elevational view in section of the input hopper and the feed belt for feeding tags from the hopper.

The tags to be read are loaded into the input hopper 18 with the length dimension of the tags extending parallel to the plane of FIGS. 3 and 8. In other words, the various lines of printing on the documents extend perpendicular to the plane of FIGS. 3 and 8. The tags loaded into the hopper are pushed manually to the rear and the right so that their rear longitudinal edges and their front edges contact and are aligned by the corresponding rear and right hand walls of the hopper. A hopper weight 20 guided for vertical movement on a rod 22 of the hopper applies a downwardly directed force to only the forward, leading portions of the stack of tags in the hopper. The lowermost tags in the hopper at their rearward trailing ends engage and are supported by an obliquely inclined downwardly sloping lower plate 24 of the hopper.

The tags are fed from the hopper 18 as follows. Still referring to FIGS. 3 and 8, the rightmost portion of the lowermost tag in the hopper is sucked downwardly against the rightwardly moving portion 26 of an underlying perforated suction belt 28. The tag is consequently pulled toward the right off the bottom of the stack through a gate or throat 29 whose height is sufficient to allow only one of the tags to pass through at a time. Suction belt 28 (see also FIGS. 2 and 4) is an endless loop of elastomeric perforated strip material entrained around three rollers 30, 32, 34. The belt perforations 36 (FIGS. 2, 4, 8) extend completely through the belt and are closely spaced to one another throughout the entire length and width of the belt. As seen in FIG. 4, the perforations may be provided in three parallel longitudinal rows. Belt 28 is continuously driven in a clockwise direction as viewed in FIGS. 3 and 8 by a motor-driven drive belt 38 effective to drive roller 32 through a pulley 40 fast with the latter. Suction is applied to the run 26 of feed belt 28 from a hollow suction box 42 on which the belt rides between its rollers 30 and 32. A suction pipe 44 connected to the interior of suction box 42 applies suction to the latter from any suitable vacuum pump source. Box 42 is provided with three parallel elongated slots 46 communicating between its hollow interior and its upper exterior surface on which feed belt 28 rides. Each row of belt perforations 36 is aligned with one of slots 46. Suction is thus applied to each row of perforations of feed belt 28 through a related slot 46.

The run 26 of the suction belt 28 which feeds successive tags from the hopper forms an initial part of a feed path, the remainder of which will be described subsequently. As seen in FIG. 3, the entire feed path for the tags extends downwardly at approximately a 20° angle to the horizontal. As shown in FIG. 2, the feed path is also positioned in a plane substantially perpendicular to the rearwardly sloping forward guide or reference wall 16 of housing 14.

The tag may have fuzzy, protruding portions extending transversely out of the plane of the tag if the tag has poorly cut perforations or if the tag is a tag part that has been torn off a plural part tag. This may result in the two lowermost tags in the hopper 18 tending to lock together and thereby result in a tag jam when the feed belt 28 attempts to feed the lowermost tag. The present construction minimizes such possible interlocking of the two lowermost tags. The lowermost tag, i.e., the one to be next fed, is supported at its rearward end on the obliquely sloping plate 24 and at its forward end is held against the feed belt by the weight of the tag stack including the hopper weight 20 acting only on the forward portions of the tags. Because of the inclination of the tag relative to the feed belt, the feed belt engages and grips the lowermost tag only at the latter's extreme forward end portion. Hence, since the lowermost tag is in essence a beam supported at only its opposed ends, it therefore flexes concavely downwardly to separate it from the adjacent upper tag, thereby minimizing any likelihood that two tags will lock together. The foregoing downward flexing of the lowermost tag will also prevent the suction from feed belt 28 being transmitted through any perforations in the lowermost tag to the next higher tag, which might cause an unintended feed of the higher tag.

As soon as the trailing end of the lowermost tag is fed from the input hooper 18 through gate 29 by the suction feed belt 28, the next lowermost tag immediately drops down for repetition of the foregoing feeding operation. The feed belt 28 feeds the tags at a speed of around 27 inches per second. The feed belt 28 feeds the tags to two successive pairs of drive rollers 48, 50 which accelerate the tags to a higher feeding speed of about 40 inches per second. the two roller pairs 48, 50 have their axes of rotation at a slightly skewed angle (rather than a right angle) to the adjacent reference guide wall 16 of housing 14, whereby the roller pairs will drive the tags not only longitudinally along the feed path but also rearwardly so as to urge the tags against wall 16. The latter thereby functions as a reference or guide surface for accurately locating the tags laterally for the subsequent reading operation, by guiding the tags on their rearward longitudinal side edges as they are moving along the feed path.

The tags, moving downwardly and to the right from the roller pairs 48 and 50, are picked up and fed by the lowermost run 52 of an overlying elastomeric perforated suction reading transport belt 54 like but longer than belt 28. Belt 54 carries the tags past the OCR reading head 56, where the OCR printed information on the tags is automatically read. Transport belt 54 is in the form of a closed loop and is entrained around three rollers 58, 60, 62. As best seen in FIGS. 4, 6, and 7, belt 54 is provided with three closely adjacent longitudinal rows of closely spaced perforations 63. It is continuously driven counterclockwise at a speed of about 40 inches per second by motor-driven drive belt 64 cooperable with a pulley 66 fast with roller 60.

Suction is applied to the lower run 52 of the perforated suction transport belt 54 by an overlying hollow suction box 68 connected by pipe 69 to the same vacuum pump source as suction pipe 44 of the feed suction box 42. The transport belt run 52 rides on the overlying undersurface of suction box 68. Three parallel elongated slots 70 (FIG. 4) in the undersurface of suction box 68 communicate with the hollow interior of the box to apply the suction to the through holes or perforations 63 of transport belt 54. Slots 70 are coextensive in length with run 52 of belt 54. Each slot 70 is in alignment with and applies the suction to a related one of the underlying rows of perforations 63.

As discussed earlier, the skewed accelerating roller pairs 48, 50 accelerate the tags to a feed rate of 40 inches per second, which is the feeding speed of the read transport belt 54. The accelerating rollers also increase the longitudinal separation between adjacent tags being fed to them by feed belt 28. It will be recalled that the latter's feeding speed is about 27 inches per second. This greater longitudinal separation is desirable in that it makes it easier, and allows more space and time, to sense the beginning and end of each successive tag moving down the feed path.

The foregoing is true even when the documents being fed are tags of different intermixed lengths. As soon as the lowermost tag, regardless of its length, has been fed from the input hopper 18 by feed belt 28, the next higher tag immediately moves down so that it now can be fed. Furthermore, because the present system feeds in the direction of the ticket length and transverse to the direction of each line of characters, and with a continuously moving and continuously effective feed means such as the present vacuum belts, a greater number of tickets per unit of time will be fed if shorter tickets are present. This occurs because as soon as the lowermost ticket has been fed from input hopper 18, the next ticket is immediately and automatically suction-attracted to feed belt 28 and fed by the latter.

Transport belt 54 transports the successive tags to the right (FIG. 3) in the direction of their length past the OCR reading head 56. The lines of printing on each tag are thus moved successively past the reading head; and the latter in accordance with known principles will read each successive line 4 of OCR printing on the tag and generate signals corresponding to the various characters read. These signals are processed in the reader logic 74 (FIG. 5).

If the reader logic indicates that the tag has been correctly read and contains valid information, the logic controls a flipper arm 76 to be rocked a short distance clockwise upwardly from its normally ineffective lowered counterclockwise position of FIG. 3. The upwardly rocked flipper arm is now positioned in the path of and to be engaged by the leading end of the tag being fed forward (to the right) on belt 54, and thereby strip the tag off the belt. The properly read tag thus falls into the discharge chute 78. However, if the reader logic indicates an improper reading of the tag or that the tag does not contain valid information or no OCR information, etc. the flipper arm is caused to remain in its lower, ineffective FIG. 3 position whereby the tag is fed by belt 54 above and past the arm and to be deposited on the upper surface of a reject stacker plate 80. The latter plate is mounted for vertical movement in the direction of a rod 82 on which it is rigidly mounted. Arm 82 and therefore plate 80 are biased upwardly by spring 84. Thus, tags fed to the reject stacker will push the latter down against the bias of spring 84.

Suitable tag sensors, preferably of the photoelectric type, are positioned along the feed path for timing and control purposes. Referring to FIG. 3, there is provided a tag jam sensor 86 just downstream of throat 29. If this does not sense the passage of a tag after a predetermined period of time, this will indicate a tag jam upstream. Just upstream of the reading head 56 is a tag presence sensor 88. This is employed to sense the passage of all tags, including those oriented with the printed face up. The passage of such tags through the system would otherwise not be detected. Downstream of the reading head 56 is a sensor 90 which controls the timing of the operation of flipper arm 76 with respect to tags which have been read and are moving toward the flipper arm.

It will of course be understood that since the OCR reader 56 reads the tags from underneath, it will successfully read only those tags which were placed in the input hopper printed face down. However, when loading the hopper, the operator need not be concerned with the face up or down, or the front to rear orientation of any of the tags. All she need do is insert the tags at random irrespective of their up-down or front-rear orientation. The reader will read those tags with the printed face down. The reader logic is so arranged that from the OCR information on the tags it will recognize and distinguish between the face-down tags which are oriented rear-front and those oriented front-rear. The reader will read the tags with both orientations, and will appropriately invert the information read from the rear-front oriented tags. Alternatively, the tags may have suitable differential markings provided on their back face, i.e., the non-printed face, which can be sensed by an overlying appropriate sensor 91 along the feed path upstream of the reading head to determine the rear-front orientation of each document and correspondingly control the handling of the data read. For example, along the opposed side edge portions of the back face may be placed one and two dark-colored index marks respectively. The sensor 91 would be positioned to read along only one side edge portion. Its sensing of the one or the two marks, as the case may be, indicates to the reader logic what is the front-rear orientation of the downwardly facing tag.

After a tag reading run, the reject stacker will contain face-up tags, plus face-down tags which were rejected as not being properly readable. This reject stack of tags is then placed upside down in the input hopper 18 and a second reading run commenced. The previously face-up tags will now be face-down to be read. Successive reading runs are performed on each resulting reject stack of tags, which is placed upside down in the input hopper after each reading run, to give the system the opportunity to properly read tags it rejected on a previous pass.

The OCR reader, in accordance with known principles of such readers, will not read the non-OCR data printed on the tags. However, to minimize the possibility of unintended accidental reading of the non-OCR data by the OCR reading head 56, the reading head and its logic may be specially designed to read characters falling only within a certain range of heights, say 0.090 inches to 0.125 inches.

In addition to the reader logic, further logic for editing and control purposes may also be included in the system. The reader logic and the further editing and control logic may be incorporated in a suitable microprocessor or microprocessors. The data read from the tags is entered onto a magnetic tape unit 92 (FIG. 5) forming part of the system. Also part of the system is a keyboard 94 by which information may also be entered onto the magnetic tape, e.g., information which the reader was unable to read from a tag or information additional to that contained on a tag. There may also be provided a display unit 96 on which is displayed the information entered from keyboard 94. The reader logic may also be connected to display unit 96 to have the latter display also the information read from the tags.

The transport means of the present system enables the tags to be properly and accurately fed even though they may be curled, wrinkled, bent, or otherwise deformed or mutilated. The tags are pulled towards and held against the feeding belts 28 and 54 in intimate face-to-face driven contact with the latter. This serves to flatten the tags out for proper and accurate feeding even though they are curled, bent, etc. Preferably, as disclosed herein suction means is used to hold the tags against the belts. However, other means could be employed for this purpose. For example, the tags could be held pressed against the belt feeding it by a second belt, the tags being sandwiched between the two belts. If such an arrangement were employed to transport the tags past the reading head, the second belt, which would underlie the tags, would be transparent so that the tags could be read through it.

Also because the tags are transported from overhead (by the overlying transport belt 54) and the automatic reading done from underneath the tags (by reading head 56), a number of advantages result. For example, the selection of the tags is simplified. The flipper arm 76 only need peel or strip a "good" tag off the belt and the tag simply falls down into the discharge hopper 78. This minimizes the likelihood of tag jams and of overrunning tickets, i.e., tickets which ride on top of each other.

Furthermore, since the tags are carried on the bottom surface of transport belt 54, this minimizes build-up of dirt and dust on the belt.

Furthermore, the transport-from-above and read-from-below arrangement of the system makes for open accessibility to the system components lying along the feed path. This greatly simplifies and makes considerably cheaper operating maintenance of the system. This has been a major problem with prior tag transport and reading systems.

Although in the aforedescribed specific embodiment the tag is fed lengthwise, i.e., in the direction transverse to the printed lines thereon, various aspects of the invention are also applicable to and useable in systems where the tags are fed in a direction transverse to their length for reading, i.e., parallel to the lines of printed data.

It will therefore be understood that the various principles and features of the invention are susceptible of numerous modifications and applications in many contexts and environments other than the specific machine disclosed herein. Accordingly, it should be understood that the foregoing disclosure of a specific embodiment of the invention and in a particular machine is intended to be illustrative and exemplary only, and in no way limitative of the following claims.

We claim:

1. A system for handling documents, said documents comprising documents which have marked thereon machine readable data relating to articles to which said documents have been attached and from which they have been detached, said system comprising:
   a feed path along which said documents are to be fed;
   means for feeding said documents along said feed path;
   said feeding means comprising belt means providing a movable feeding surface;
   means for moving said belt means;
   means for maintaining said documents in face-to-face driven contact with said feeding surface of said belt means so that said documents are fed along said feed path by said movable feeding surface;
   said feeding surface of said belt means being substantially flat; and
   means located along and below said feed path for reading said machine readable data from documents overlying said reading means and moving along said feed path;
   said feeding means overlying said feed path for feeding said documents underlying said feeding means along said feed path and past said reading means.

2. The system according to claim 1, wherein:
   said maintaining means comprises suction means.

3. The system according to claim 1, wherein:
   said belt means is provided with perforations; and
   said maintaining means comprises suction means;
   said suction means including said perforations.

4. The system according to claim 3, wherein:
   said perforations extend in a substantially straight line from said substantially flat feeding surface of said belt means completely through said belt means.

5. The system according to claim 1, wherein:
   said suction means include a hollow suction box means having a substantially flat, exposed exterior surface against which said belt means rides;
   said suction box means having opening means therein providing communication between said substantially flat exterior surface portion of said suction box and the hollow interior thereof.

6. The system according to claim 1, wherein:
   said opening means comprises slot means extending in the direction of said feed path.

7. The system according to claim 1, including:
   hopper means for receiving a stack of documents;
   said hopper means having a discharge portion from which said documents are fed from said hopper means;
   said feeding means being arranged to feed said documents from said hopper means.

8. The system according to claim 1, wherein:
   some of said documents each contains at least one line of said machine readable data;
   said line extending in a given direction transverse to the direction in which said documents are fed along said feed path past said reading means.

9. The system according to claim 8, wherein:
   said documents have said machine readable data marked thereon along separate spaced lines extending in said given direction.

10. The system according to claim 9, wherein:
    said feeding means and said reading means are arranged so that said documents are fed to present their various lines of machine readable data serially to said reading means for the successive reading of each line of said data by said reading means.

11. The system according to claim 10, wherein: said data comprises OCR characters.

12. The system according to claim 9, wherein: said documents are respectively of different intermixed dimensions measured in the direction in which they are fed along said feed path.

13. The system according to claim 8, wherein: said documents are respectively of different intermixed dimensions measured in the direction in which they are fed along said feed path.

14. The system according to claim 1, wherein: at least some of said documents are substantially rectangular in shape and are fed along said feed path in the direction of their longer dimension.

15. A system for handling documents, said documents comprising documents which have marked thereon machine readable data relating to articles to which said documents have been attached and from which they have been detached, said system comprising:
 a feed path along which said documents are to be fed;
 means for feeding said documents along said feed path;
 said feeding means comprising suction belt means providing a movable feeding surface;
 means for moving said belt means;
 means for maintaining said documents in face-to-face driven contact with said feeding surface of said belt means so that said documents are fed along said feed path by said movable feeding surface;
 said feeding surface of said belt means being substantially flat;
 a document processing station disposed along said feed path, said document processing station comprising means for reading said machine readable data from said documents;
 some of said documents each containing several separate spaced lines of said machine readable data past marked thereon, said lines extending transverse to the direction in which said documents are fed along said feed path past said reading means;
 said feeding means and said reading means being arranged so that each document is fed to present its various lines of data serially to said reading means for the successive reading of each line of data by said reading means.

* * * * *

UNITED STATES PATENT AND TRADEMARK OFFICE
CERTIFICATE OF CORRECTION

PATENT NO. : 4,208,009

DATED : Jun. 17, 1980

INVENTOR(S) : Carl O. Markkanen, William G. Benson, Amnon Goldstein

It is certified that error appears in the above—identified patent and that said Letters Patent is hereby corrected as shown below:

Column 2, line 18, change "is" to --in-- line 63, change "representation" to --representative--

Column 4, line 44, change "hooper" to --hopper-- line 51, change "the" to --The--

Signed and Sealed this

Fourteenth Day of October 1980

[SEAL]

Attest:

SIDNEY A. DIAMOND

Attesting Officer

Commissioner of Patents and Trademarks